(12) United States Patent
Nicolet

(10) Patent No.: X8880
(45) Date of Patent: Jun. 12, 1835

(54) STEAM BOAT, ANTI-FRICTION WHEELS

(76) Inventor: Julian Nicolet

Julien Nicolet of Pittsburg Pennsylvania
Letters Patent

The Schedule referred to in these Letters Patent and making part of the same containing a description in the words of the said Julien Nicolet himself of his improvement in machinery called the antifriction wheels particularly applicable to Steam Boats.

To all to whom these presents shall come. Be it known that I Julien Nicolet of the City of Pittsburg in the State of Pennsylvania have invented a new and useful improvement in machinery called antifriction wheels, particularly applicable to Steam Boats. and that the following is a full and exact description of the construction and operation of the same. The friction wheels which I use, are made of cast iron or any other suitable material, in the form of a short hollow cylinder, with one end closed and the other open. or in other words. of a plane wheel with a narrow flange projecting at right angles from its circumference, the dimensions being varied to suit circumstances. At the centre a square opening is left, for the shaft which for strength is also surrounded by a thick flange. The shaft on which the wheel is made permanent, and which should be of well tempered steel. passes through the centre opening and projects sufficiently far on both sides. to form the journals or bearings of the wheel. Allthough the bearings may be varied; those which I prefer are as follows; an upright plate of iron with a rectangular foot or ear to secure it by screws. is made fast to the top of the bearing timbers, or a straight plate when that form will suit the situation best, is to be used. in the upper end a hole is made for one journal of the friction wheel or a suitable box may be attached thereto. the other Journal being supported in a similar hole or box. in the upper end of a short iron cap, or rectangular arm, secured firmly to the back of the plate, just mentioned. the wheel lying between them. with the cavity towards the plate. A hole is made in the plate of sufficient size; to admit and allow to play freely, the shaft of the balance wheel or other shaft, to be relieved. Of the friction, its lower side or end extending a short distance below the flange of the friction wheel. by which means the shaft is caused to bear on the inner surface of the flange, and the friction of the same is relieved or diminished in the proportion which the diameter of the flange bears to the diameter of the journal of the friction wheel and shaft jointly. On the end of the shaft a journal is turned as truly cylindrical as possible. being well tempered, and something shorter than the depth of the flange. The square shoulder of the shaft thus formed, prevents the end of the journal from coming in contact with the plane of the wheel. and the sides of the hole in the plate serve to check the lateral movement of the shaft, to receive the pressure of which lateral friction rollers attached to the plate may be employed. These wheels I apply, one at each end of the shaft of water wheels or balance wheels used for propelling mills and factories. also to the paddle wheels and balance wheel of Boats to be propelled by steam or other power. and have found by a variety of experiments, that their application effects an immense saving of power and expense of machinery. and particularly when applied to Steam Boats, of additional weight of machinery. and loss of life consequent upon the employment of Engines. and Boilers far more powerful than what would be required with my improvement.

Now I do not claim to have invented the friction wheel described herein. but its application to the specific purposes herein set forth. In testimony that the foregoing is a true specification of my said improvement, I have hereunto set my hand at the City of Washington this 30th day of May 1835.

[illegible] Witnesses
[illegible] Sam Stettinius
James Tate

Julien Nicolet ([illegible])

(June 12, 1835)

(Drawing)

Edward Newman
Letters Patent
(Patented November 26. 1835.)

The Schedule referred to in these Letters Patent and making part of the same containing a description in the words of the said Edward Newman himself of his improvement in the tub water wheel.

---

Edward Newman's specification or Improvement of the circular enclosed tub wheel with open elbow buckets or floats. The wheel to be horizontal and contain eighteen floats or buckets there may be more or less so as to suit the stream or head of water. 1. The tub wheel may be made any size that may be most convenient to the stream of water. 2. the buckets to be eight inches in length and made in an elbow form and forming an angle of forty five degrees and nine inches in width three inches at the top called the elbow and forming an angle also of forty degrees — 2. The forebay to be formed in any manner most convenient so as to admit of two shoots or water lanes, the first shoot or lane letting the water in a half circle directly from the forebay upon nine floats or buckets at the same time the lanes or shoots to be nine inches in width the second shoot or water lane to be carried round the tub wheel and then thrown back upon the wheel so that it will strike the other nine flotes or buckets on the oposite side of the wheel in the same manner as before described but propelling the wheel in the same direction and at the same time thereby doubling the force and power of the water upon the wheel at one and the same time the water passing away from the wheel by falling immediately under the same into a case. 3. There must be placed upon the wheel at the circumference of the buckets a hoop or circle so as to prevent the water from falling upon the solid part of the wheel. 4. The water falling upon all the floats or buckets in the wheel at the same time striking one inch on the point of each of the buckets untill it passes to the ninth float on each side of the wheel from both of the water lanes or shoots thereby propelling the wheel by the power and wate of the water and in the same direction. July 22nd A.D. 1835.

Robert Cooper }
A. M. Lyan } Witnesses

Edward his X mark Newman

E. 6.
C.K.W.

([illegible] Recorded anew May 25. 1837)

([illegible] [illegible])

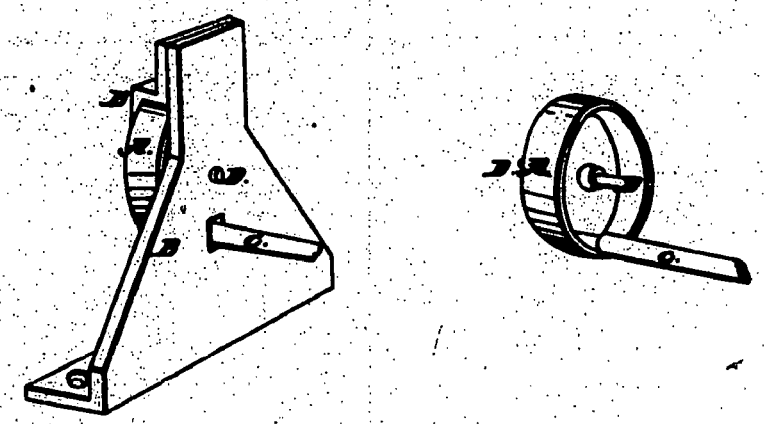

United States Patent
Patent No.: X8880
J. Nicolet,
Anti-Friction Roller.
Patented June 12, 1835.